United States Patent [19]

Ohara et al.

[11] 4,429,241
[45] Jan. 31, 1984

[54] RADIO NOISE SUPPRESSION DEVICE FOR A COMMUTATOR MOTOR

[75] Inventors: Takezi Ohara, Fuchi; Yasuhisa Kodama, Hiroshima, both of Japan

[73] Assignee: Ryobi Ltd., Hiroshima, Japan

[21] Appl. No.: 43,960

[22] Filed: May 30, 1979

[30] Foreign Application Priority Data

May 31, 1978 [JP] Japan .............................. 53-74902[U]

[51] Int. Cl.³ ............................................. H02K 5/24
[52] U.S. Cl. ................................... 310/51; 310/68 R; 310/72; 307/105; 333/181
[58] Field of Search ...................... 310/68 R, 68 C, 51, 310/66, 72, 71, 154, 258, 259; 333/12, 181, 165, 175, 176; 307/105

[56] References Cited

U.S. PATENT DOCUMENTS

| | | | |
|---|---|---|---|
| 2,242,333 | 5/1941 | Thunberg | 310/68 R |
| 2,456,701 | 12/1948 | Hansen | 310/154 |
| 3,238,434 | 3/1966 | Blitz | 310/68 R |
| 3,631,277 | 12/1971 | Ferdig | 310/154 |
| 3,668,571 | 6/1972 | Sato | 333/181 |
| 3,790,830 | 2/1974 | Bonfiglio | 310/154 |

*Primary Examiner*—R. Skudy
*Attorney, Agent, or Firm*—Sughrue, Mion, Zinn, Macpeak and Seas

[57] ABSTRACT

A commutator motor having a radio noise preventing device, where a common ground terminal of radio noise preventing capacitors is connected to a stator core. The stator core has two opposed arcuately faced poles around which field windings are respectively wound. A pair of non-magnetic metal pieces are provided between the poles in opposing relation, so that they surround an armature with the poles.

4 Claims, 5 Drawing Figures

RADIO NOISE SUPPRESSION DEVICE FOR A COMMUTATOR MOTOR

BACKGROUND OF THE INVENTION

This invention relates to a commutator motor, and more particularly to a radio noise preventing device for use in a commutator motor.

Heretofore, in order to reduce a radio noise generated during a driving operation of a commutator motor, a radio noise preventing device as shown in FIGS. 1 and 2 has been proposed. In FIGS. 1 and 2, a common ground terminal 2 of radio noise preventing capacitors 1 is connected to a stator core 3, to form closed loops 5 and 5', whereby an unsymmetrical noise component contained in a power source is fed-back to an armature 4 to attenuate the noise component. Reference numerals 6 and 6' designate field windings.

In this case, however, an impedance value of a capacitor defined by an air gap between the armature and the stator core is considerably high to low frequency noise, and therefore a sufficient radio noise suppressing circuit effect may not be attained.

SUMMARY OF THE INVENTION

Accordingly, an object of this invention is to eliminate the above described drawbacks accompanying the conventional commutator motor.

Another object of this invention is to provide a commutator motor having an improved radio noise preventing device capable of effectively suppressing a radio noise, which is obtained by providing simple attachments without any modification in the shapes of a stator core and the other circuit elements.

These and other objects of this invention are accomplished in a commutator motor having a radio noise preventing device, where a common ground terminal of radio noise preventing capacitors is connected to a stator core having two opposed arcuately faced stator poles and a pair of non-magnetic metal pieces are provided between the edge portions of the stator poles in opposing relation, so that they surround an armature with the poles.

A preferred embodiment of this invention will be described in detail with reference to the accompanying drawings.

DETAILED DESCRIPTION OF THE PREFERRED EMBODIMENT

Figure 1:
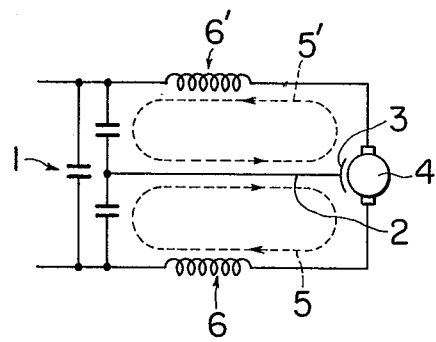
FIG. 1 is a schematic circuit diagram showing a conventional radio noise preventing device for use in a commutator motor.
Figure 3:
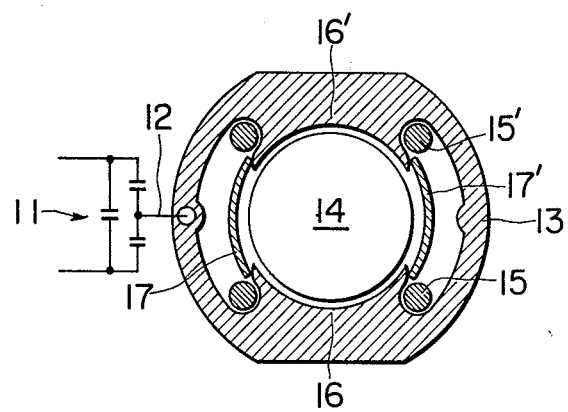
FIG. 3 is a cross-sectional view illustrating a stator core of a commutator motor having a radio noise preventing device according to this invention.

In FIG. 3 which shows a cross-sectional view of the stator core of a commutator motor according to this invention, reference numeral 11 designates radio noise preventing capacitors; reference numeral 12, a common ground terminal of the capacitors 12, reference numeral 13, a stator core, reference numeral 14, an armature, and reference numerals 15 and 15', field windings. These circuit elements are connected each other as shown in FIG. 1.

According to this invention, a pair of non-magnetic metal pieces 17 and 17' are provided between the edge portions of two opposed arcuately faced stator poles 16 and 16' in opposing relation, so that they surround the armature 14 with the stator poles 16 and 16'. By provision of these non-magnetic metal pieces 17 and 17', the capacitance of a capacitor defined by an air gap between the armature 14 and the stator core 13 can be increased, thereby resulting in decreasing of the impedance between the armature 14 and the stator core 13. Accordingly, it becomes easier to feed-back a low frequency noise component (i.e., an unsymmetrical noise component) to the armature 14. As a result, it is possible to attenuate the low frequency noise component.

Figure 2:
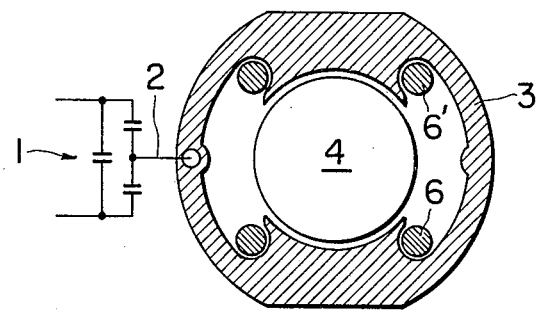
FIG. 2 is a cross-sectional view illustrating a stator core of the conventional commutator motor having a radio noise preventing device.

The radio noise preventing effects of this invention will be described by comparing the concrete example of this invention as shown in FIG. 3 with the conventional one as shown in FIG. 2.

A comparative test is carried out in accordance with C.I.S.P.R. standard (INTERNATIONAL SPECIAL COMMITTEE ON RADIO INTERFERENCE), under the condition that the same capacitors are employed as a noise preventing capacitor in the both radio noise preventing devices. The C.I.S.P.R. standard is disclosed in C.I.S.P.R. Publication No. 14 (1975). A radio interference measuring apparatus for the frequency range 0.15 MHz to 30 MHz which complies with C.I.S.P.R. Publication No. 1 (1972) is used to measure noise terminal voltages.

EXAMPLE 1

Noise preventing capacitors: $0.1 \ \mu F + 0.003 \ \mu F \times 2$

Figure 4:
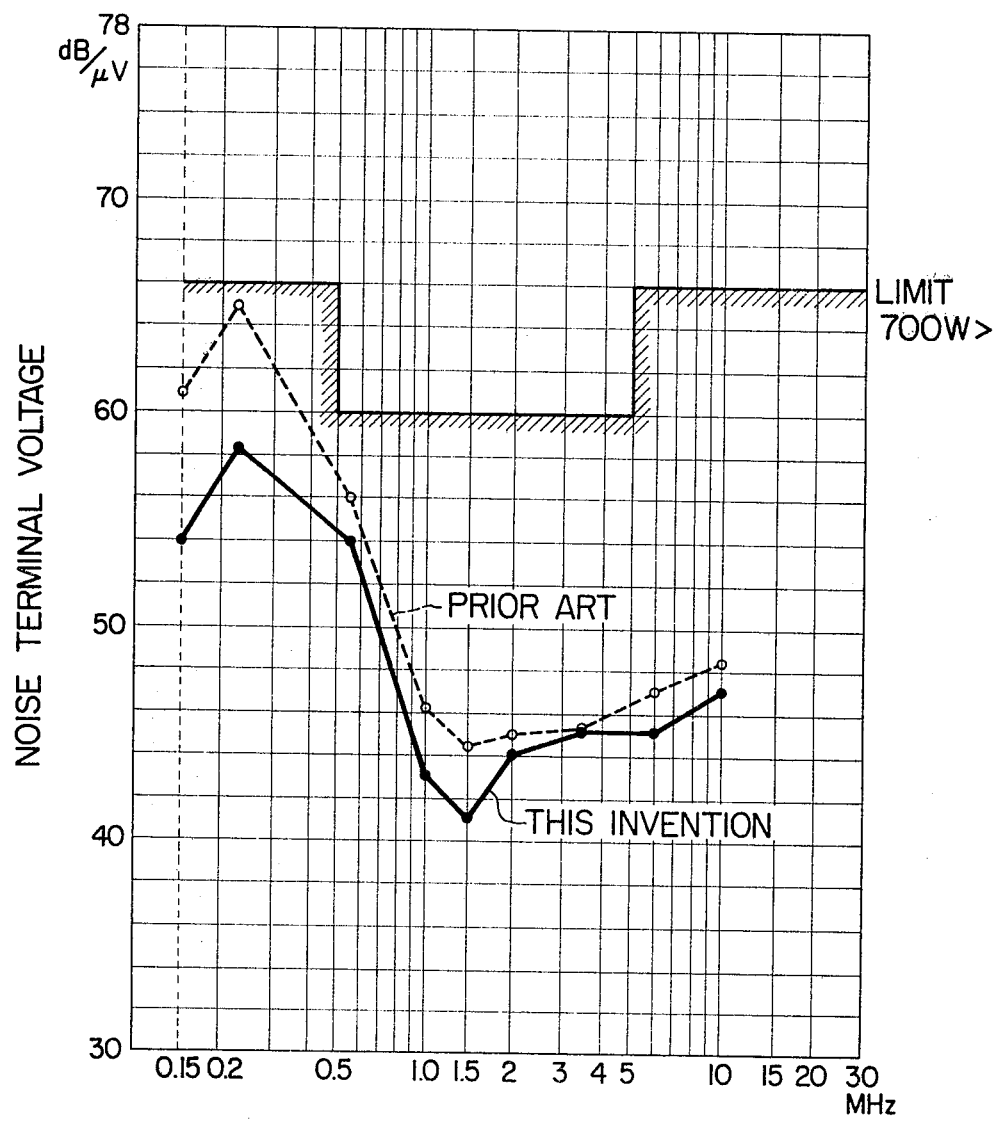
FIGS. 4 and 5 are graphical representation indicating the measurement results of the noise terminal voltage of the commutator motor according to this invention and of the conventional commutator motor.

A commutator motor incorporated in electric appliances, whose power consumption was equal to or less than 700 watts was tested. The measurement values in the radio noise preventing device of the commutator motor according to this invention were compared with those in the conventional one having no non-magnetic metal pieces. The comparative test data are indicated in a graphical representation shown in FIG. 4. As is apparent from the FIG. 4, it is possible to lower the noise terminal voltages over a wide range of frequency to thereby suppress the radio noise effectively.

EXAMPLE 2

Figure 5:
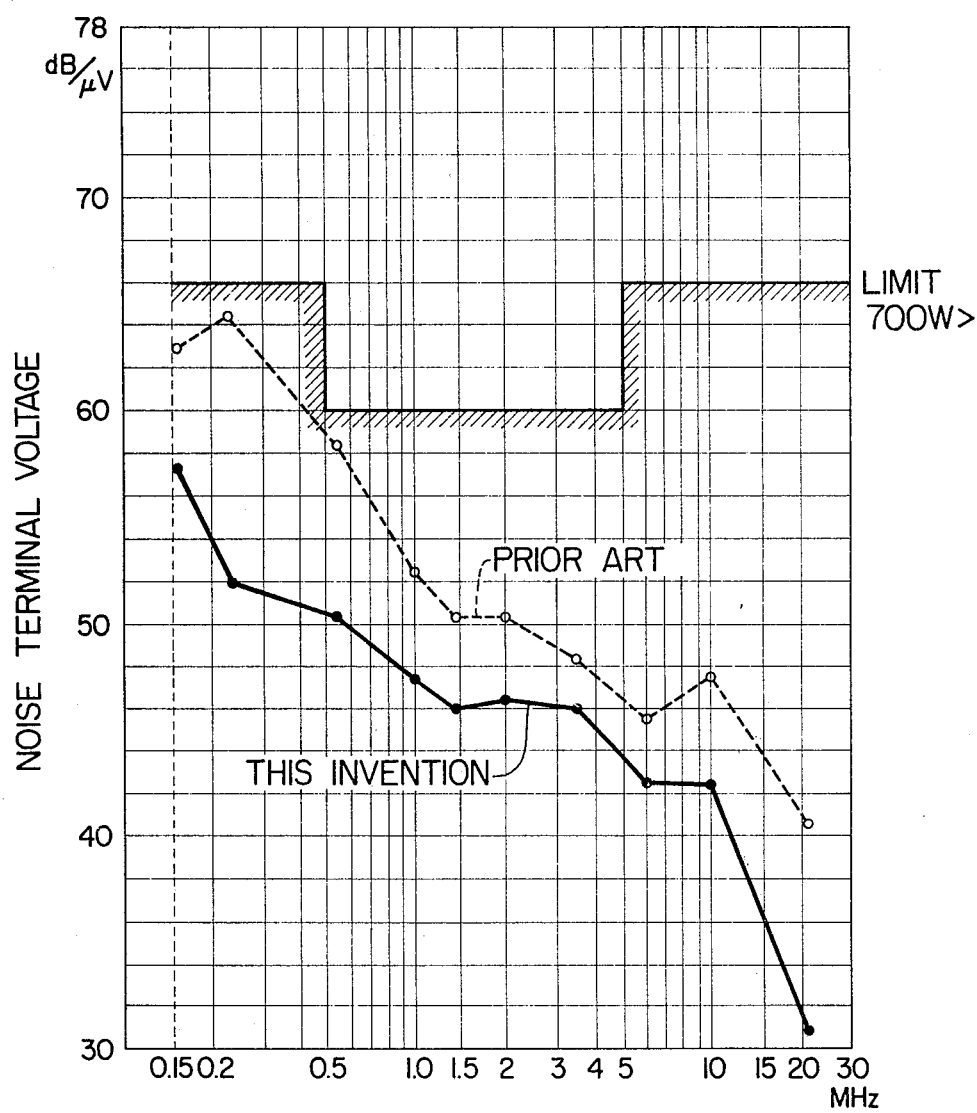

The noise preventing capacitors were changed to $0.2 \ \mu F$ and $0.003 \ \mu F \times 2$, and then the same comparative text was carried out. The comparative data is indicated in a graphical representation shown in FIG. 5. As is apparent from the FIG. 5, it is also possible to lower the noise terminal voltages over a wide range of frequency to thereby suppress the radio noise effectively.

As is apparent from the above description, the impedance between the stator core 13 and the armature 14 can be reduced by the provision of the non-magnetic metal pieces 17 and 17' when compared with that of the conventional commutator motor. Accordingly, the feed-back operation of low frequency noise component to the armature 14 can be more effectively attained to thereby attenuate the low frequency noise component. Hence, according to this invention, a sufficient noise preventing effect can be obtained. Furthermore, since this invention can be applied to any conventional commutator motor without modifying the shapes of the stator core and the other circuit elements, manufacturing cost can be reduced.

Modifications are possible without departing from the essential scope of this invention.

What is claimed is:

1. In a commutator motor having radio noise preventing capacitors, a common ground terminal of which is connected to a stator core of said commutator motor, said stator core being capacitively coupled to the armature of said motor, an improvement characterized in that:

a pair of non-magnetic metal pieces are provided to bridge between edge portions of stator poles of said commutator motor in opposing relation, so that said non-magnetic metal pieces surround an armature of said commutator motor with said stator poles, to thereby increase the capacitive coupling between said stator core and said armature.

2. In a commutator motor having a stator core with stator poles, an armature, and field windings, a noise preventing circuit to reduce the effect of radio noise on the operation of said motor, said noise preventing circuit comprising:

said stator core;
said armature;
said field windings; and
a capacitive network coupling said field windings to said stator core;
said stator core being capacitively coupled to said armature through an air gap between said stator core and said armature;
wherein a pair of non-magnetic metal pieces bridge the edge portions of said stator poles in opposing relation, whereby said metal pieces reduce said air gap to thereby increase the capacitance of the coupling between said stator core and said armature, wherein conduction of said radio noise between said stator core and said armature is promoted by said increased capacitance.

3. The circuit of claim 2, wherein said metal pieces have a cylindrical contour and are concentrically disposed about said armature to thereby minimize the dimensions of said air gap.

4. A process for reducing the effects of radio noise in a commutator motor having a stator, an armature and field windings, said process comprising coupling a capacitive noise reducing network to said stator core, capacitatively coupling said stator core which is provided with stator poles to said armature wherein said stator core and armature have an air gap therebetween, coupling said field windings to said capacitive noise reducing network and increasing the capacitance of said capacitive coupling by reducing the dimensions of said air gap by providing a pair of non-magnetized metal pieces across the edge portion of said stator poles to promote the conduction of said radio noise between said stator core and said armature.

* * * * *